(12) United States Patent
Fujiwara

(10) Patent No.: US 7,206,403 B2
(45) Date of Patent: Apr. 17, 2007

(54) TELEPHONE TERMINAL EQUIPMENT INTERFACE CIRCUIT

(75) Inventor: Yoshinobu Fujiwara, Tokyo (JP)

(73) Assignee: Uniden Corporation, Tokyo (JP)

( * ) Notice: Subject to any disclaimer, the term of this patent is extended or adjusted under 35 U.S.C. 154(b) by 46 days.

(21) Appl. No.: 10/689,839

(22) Filed: Oct. 22, 2003

(65) Prior Publication Data

US 2005/0089157 A1    Apr. 28, 2005

(51) Int. Cl.
 *H04M 1/00* (2006.01)
 *H04M 3/00* (2006.01)
(52) U.S. Cl. .................. 379/380; 379/399.01
(58) Field of Classification Search ........... 379/377, 379/380
See application file for complete search history.

(56) References Cited

U.S. PATENT DOCUMENTS

| | | | | |
|---|---|---|---|---|
| 4,222,096 A | * | 9/1980 | Capewell | 363/44 |
| 4,406,927 A | * | 9/1983 | Pommer, II | 379/375.01 |
| 4,623,759 A | * | 11/1986 | Todd | 379/79 |
| 5,553,138 A | * | 9/1996 | Heald et al. | 379/413 |
| 6,408,008 B1 | * | 6/2002 | Komarek et al. | 370/458 |

* cited by examiner

*Primary Examiner*—Fan Tsang
*Assistant Examiner*—Ramnandan Singh
(74) *Attorney, Agent, or Firm*—Morgan, Lewis & Bockius, LLP

(57) ABSTRACT

The object of the present invention is to remove the dead region of a diode bridge and maintain stable operations in a telephone terminal equipment interface circuit. In order to realize this object, a telephone terminal equipment interface circuit, according to the present invention comprises a diode bridge for rectifying line current supplied from a subscriber line and supplying the current to a call transmission/reception circuit, and a forward biasing circuit that supplies forward biased voltage to the diode bridge. Supplying forward biased current to the diode bridge makes the diode bridge operate in an activated state, thereby removing the dead region of the diode bridge and enabling more stable operations to be maintained in the interface circuit.

2 Claims, 2 Drawing Sheets

TELEPHONE TERMINAL EQUIPMENT INTERFACE CIRCUIT

BACKGROUND OF THE INVENTION

1. Field of the Invention

This invention relates to an interface circuit installed for an interface between a subscriber line and telephone terminal equipment, and more particularly to technological advances that reduces the dead zone characteristics of a diode bridge and improves the characteristics of direct current in an interface circuit.

2. Description of the Related Art

FIG. 4 shows a conventional telephone terminal equipment interface circuit 101. In FIG. 4 relay L is closed when the telephone is off the hook and line current that flows to the TIP terminal and the RING terminal of the subscriber line, is supplied to a call transmission/reception circuit 10 after being rectified at a diode bridge 20 comprising the diode elements D11, D12, D13 and D14.

If however, the diode elements D11, D12, D13 and D14 are composed of silicon diodes for example, the silicon diodes will not conduct if the line current supplied from the subscriber line is weak, because a voltage of 0.6 V is required to cause such diodes to conduct; thus, line current would hardly be supplied to the call transmission/reception circuit 10. In the example shown in FIG. 4 the two diode elements D11 and D14, and D13 and D12 are serially connected in the forward direction therefore, a range of 0 V to 1.2 V (=0.6 V×2) exists as a dead region. The existence of this dead region causes obstruction to the function of the call transmission/reception circuit 10.

Further, if the transmission/reception circuit 10 is designed using a diode bridge 20 with such a dead region, the direct current resistance of the interface circuit 101 must be set low in order to comply with the current-voltage characteristics laid down in the U.S. EIA-470B standards. If the direct current resistance of the interface circuit 101 is set low, excessive loop current flows into the call transmission/reception circuit 10 when there is a presence of lightning surge current in the subscriber line, thereby causing damage to equipment.

SUMMARY OF THE INVENTION

In order to solve these problems, it is an object of the present invention to remove the dead region of a diode bridge and maintain stable operations in an interface circuit.

To achieve this objective, a telephone terminal equipment interface circuit according to the present invention is comprised of a diode bridge that rectifies line current supplied from a subscriber line and supplies the current to a call transmission/reception circuit, and a forward biasing circuit that supplies forward biased voltage to the diode bridge.

Supplying forward biased current to the diode bridge makes the diode bridge operate in a more activated state, thereby removing the dead region of the diode bridge and enabling more stable operation of in the interface circuit.

It is preferable for the forward biasing circuit to be connected in series with the diode bridge. Serially connecting the forward biasing circuit in relation to the diode bridge enables the dead region of the diode bridge to be effectively removed.

Further by operating the diode bridge in an activated condition, the current-voltage characteristics in the telephone terminal equipment interface circuit can be such that both the current and the voltage can increase proportionately from a starting point. This allows the design of a telephone terminal equipment interface circuit to have a direct current resistance value greater than in a conventional telephone terminal equipment interface circuit.

Forward biased diode elements are suitable for a forward biasing circuit. Usage of diode elements can realize simple circuit construction and effectively inhibit the flow of lightning surge to the call transmission/reception circuit.

DESCRIPTION OF THE PREFERRED EMBODIMENTS

An embodiment according to the present invention will now be described with reference to the drawings.

Figure 1:
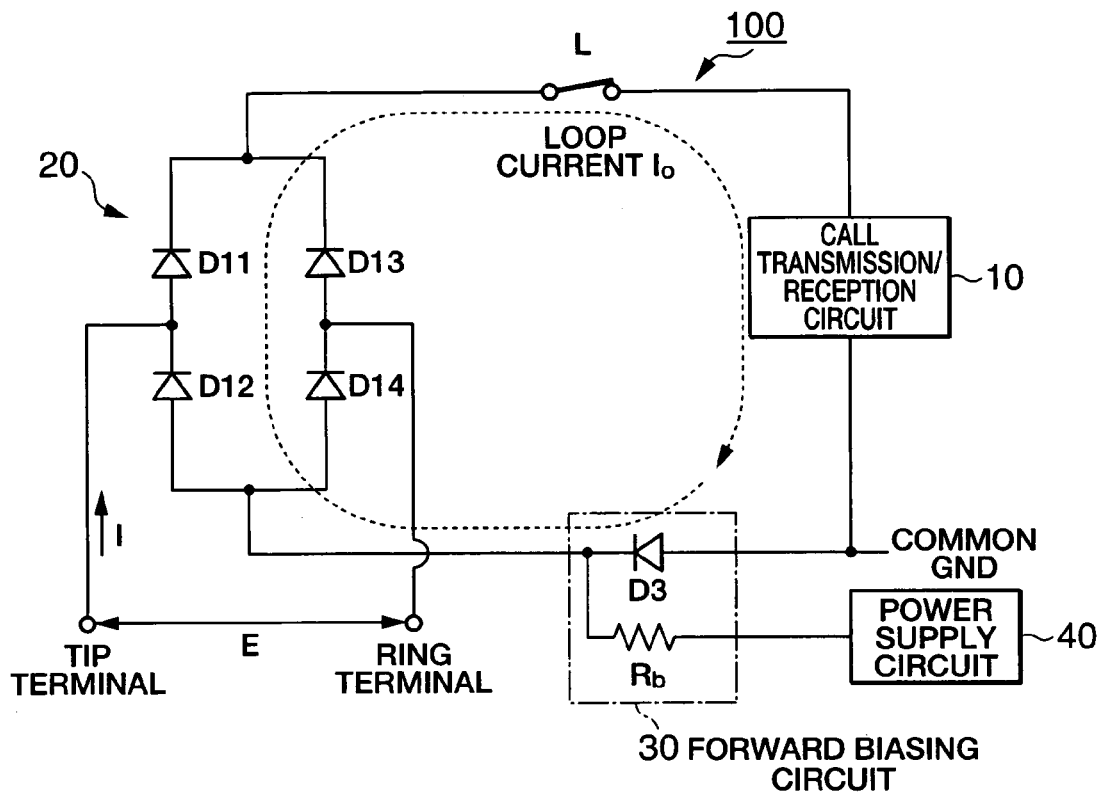
FIG. 1 shows the configuration of a telephone terminal equipment interface circuit utilizing the embodiment of the present invention.

FIG. 1 shows the configuration of a telephone terminal equipment interface circuit 100 utilizing the embodiment of the present invention. As shown in FIG. 1 the interface circuit 100 is comprised of a call transmission/reception circuit 10, a diode bridge 20 for rectifying line current made up of diode elements D11, D12, D13 and D14, a forward biasing circuit 30 for supplying forward biased voltage to the diode bridge 20 and a relay L that is in a closed/open condition when the telephone is off/on hook.

There are no particular restrictions on means that can be used to provide the forward biasing circuit 30 and any means that can sufficiently supply the biased voltage required to allow current flow through the diode elements D11, D12, D13 and D14 is acceptable. For example, the diode element D3 as shown in FIG. 1, that receives current supplied from a power supply circuit 40 via a resistor Rb and generates voltage, is preferable. Supply of a few milliamperes of forward directional electric current is sufficient to cause conduction in the diode elements D11, D12, D13 and D14, therefore a simple structure, such as the one shown in FIG. 1 wherein a part of the power supply circuit 40 is separated to supply the diode elements D3 is suitable.

When the telephone is off hook, the relay L enters a closed condition and a loop circuit is formed by the call transmission/reception circuit 10 and the diode bridge 20. When this circuit is formed, forward biased voltage is supplied from the forward biasing circuit 30 to the diode bridge 20.

Figure 2:
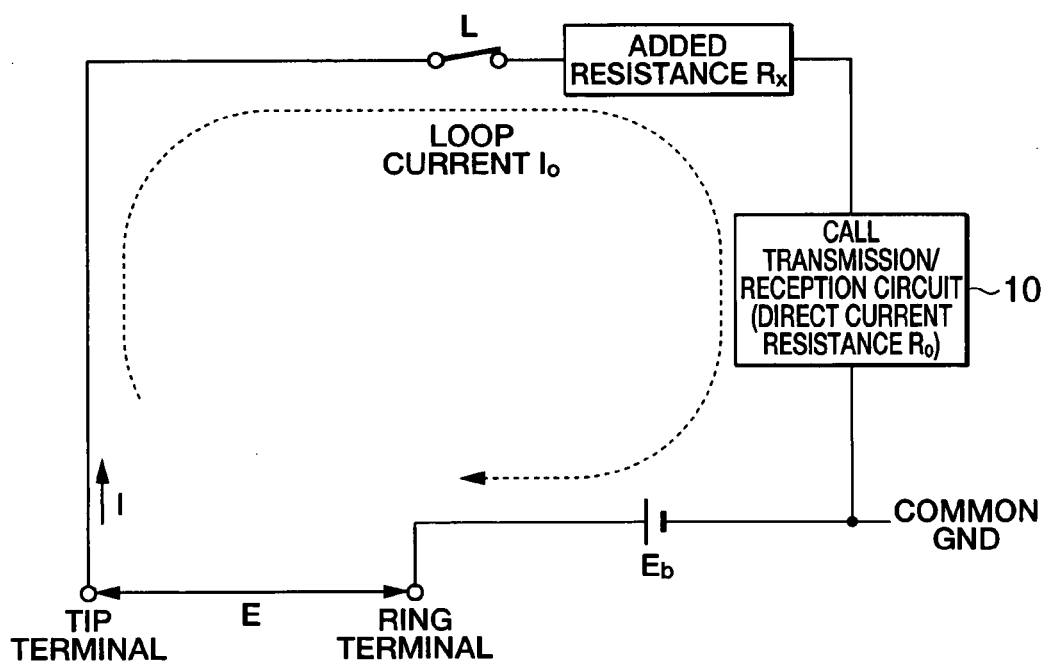
FIG. 2 is an equivalent circuit diagram of FIG. 1.

Here, when terminal voltage between the TIP terminal and RING terminal is E, current flow between the TIP terminal and RING terminal is I, direct current resistance (input resistance) between the TIP terminal and the RING terminal is R1, loop current flowing to call transmission/reception circuit 10 is $I_0$, direct current resistance for the call transmission/reception circuit 10 is $R_0$, added resistance of the loop circuit is Rx and forward biased voltage supplied by the forward biasing circuit 30 is Eb, the equivalent circuit of the interface circuit 100 is as shown in FIG. 2, and expressions (1) through (3) are established where E>1[V], $$I = I_0 \tag{1}$$

$$I_0 = (E + Eb)/(R_0 + Rx) \tag{2}$$

$$R1 = E/I \quad (3)$$

If the I is removed from expression (3), expression (4) is obtained.

$$R1 = (R_0 + Rx) \times E/(E + Eb) \quad (4)$$

The value for direct current resistance R1 is not fixed and changes according to the size of voltage E. For example, where the condition E=Eb applies, R1 decreases to $(R_0+Rx)/2$, and where the condition E>>Eb applies, R1 is asymptotic to $(R_0+Rx)$. By setting the value for Eb at a desired value, the characteristics of direct flow of interface circuit 100 can be made to comply with the EIA-470B standards.

Figure 3:
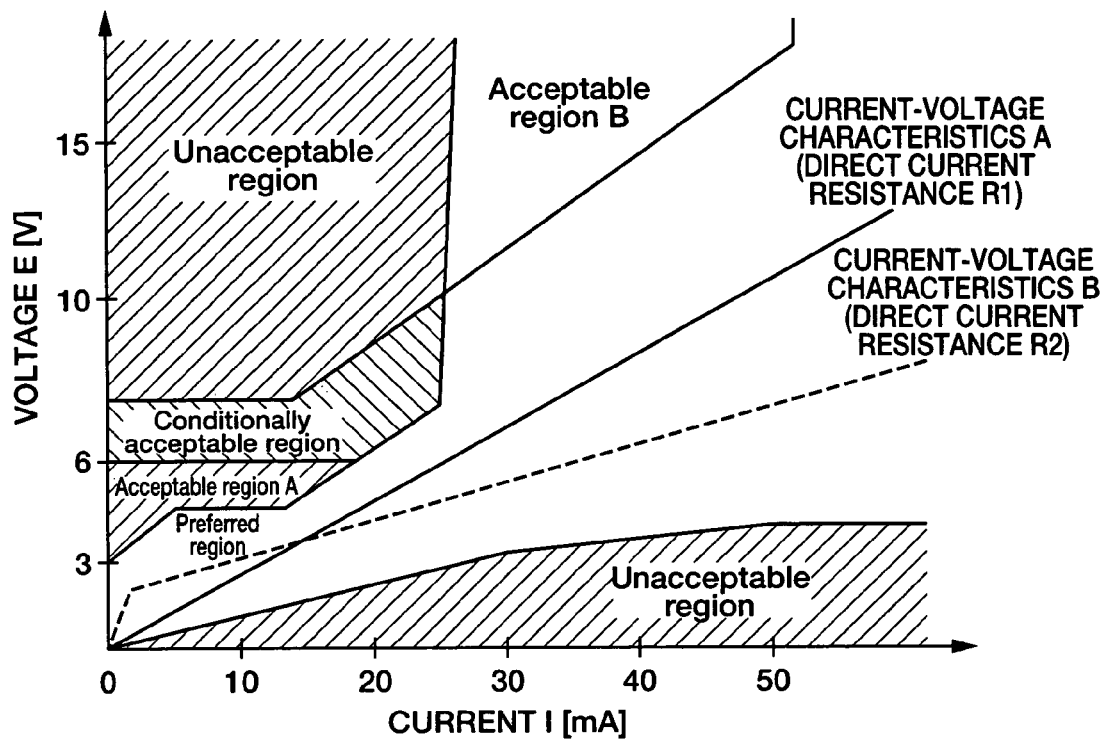
FIG. 3 is a graph showing the current-voltage characteristics of the terminal equipment interface circuit.
Figure 4:
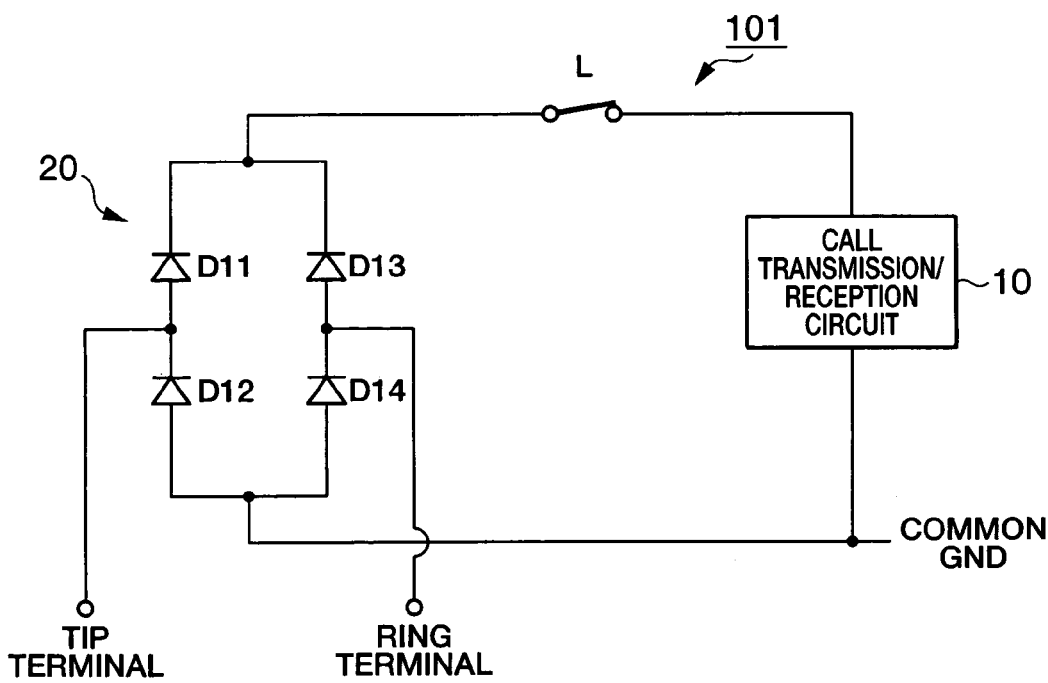
FIG. 4 shows the configuration of a conventional telephone terminal equipment interface circuit.

FIG. 3 is a graph showing the current-voltage characteristics of the interface circuits. In that graph, the current-voltage characteristics A of the interface circuit 100 utilizing the embodiment of this invention are represented by the solid line while the dotted line which shows the current-voltage characteristics B for an interface circuit 101 of the prior art. Current I [mA] is plotted on the horizontal axis and voltage E [V] is plotted on the vertical axis, such that the gradient of the respective lines indicates the value for direct current resistance. The respective regions for current/voltage usage according to the EIA-470B standards are indicated on the graph as the Preferred region, Acceptable region A, Acceptable region B, Conditionally Acceptable region and an Unacceptable region.

A dead region exists where a conventional diode bridge 20 is used such that the gradient showing the current-voltage characteristics B increases uniformly in a straight line after the voltage increases to about 1.2 V from the starting point. Accordingly, direct current resistance R2 of the interface circuit 101 must be decreased for using the interface circuit 101 in the Preferred region, As described above however, there is concern that decreasing direct current resistance R2 may result in damage to equipment when excessive loop current flows into the call transmission/reception circuit 10, if for example lightning surge current flows into the subscriber line.

In contrast to this, the gradient showing the current-voltage characteristics A increases uniformly in a straight line from the starting point. This occurs because the diode bridge 20 enters an activated state as forward biased voltage from the forward biasing circuit 30 and is applied to the diode bridge 20 when the telephone is off hook. As a result, both current and voltage between the TIP terminal and RING terminal increase at a uniform rate from 0 thereby alleviating the problem of the dead region.

Further, the characteristic of direct current resistance R1 being a nonconstant value that changes in line with the increase in voltage E can be exploited, thereby enabling a design such that the value for direct current resistance R1 is greater than the value for direct current resistance R2 when using the interface circuit 100 in the Preferred region. As a result, tolerance to lightning surge current can be improved. Moreover, besides providing forward biased current to the loop circuit and maintaining loop current $I_0$, the diode element D3 also fulfills a function of suppressing lightning surge current flowing from the subscriber line into the interface circuit 100, thereby bringing an improved tolerance to lightning surge current.

Further, in addition to the line current supplied from the subscriber line, forward biased current supplied from the forward biasing circuit 30 is superimposed to the call transmission/reception circuit 10, thereby enabling a greater dynamic range to be maintained for call transmission/reception circuit 10 in the region where line current is small.

Furthermore, as shown in FIG. 1, the TIP terminal is connected between the diode elements D11 and D12 and the RING terminal is connected between the diode elements D13 and D14. Accordingly, if the diode element characteristics of these diode elements D11, D12, D13 and D14 are made approximately the same, due to the principles of operation of the diode bridge, difference in electric potential does not appear between the TIP terminal and RING terminal. In other words, there is no leak of biased current from the forward biasing circuit 30 to the subscriber line.

In relation to the diode bridge 20, it is preferable for the forward biasing circuit 30 to be connected in series as shown in FIG. 1 rather than to be connected in parallel because the effect of removing the dead region cannot be obtained when the forward biasing circuit 30 is connected in parallel in relation to the diode bridge 20.

As described above, according to the present embodiment, the circuit design of the call transmission/reception circuit 10 and impedance of the interface circuit 100 can be separated in the design, thereby enabling compliance with EIA-470B to be achieved simply and allowing safety standards covering lightning surge and the like to be accommodated more easily. Additionally, this reduces the cost by providing a greater degree of freedom in design and allowing a wider range of parts to be selected for usage.

What is claimed is:

1. A telephone terminal equipment interface circuit comprising:
   a diode bridge for rectifying line current supplied from a subscriber line and supplying the current to a call transmission and reception circuit;
   a forward biasing circuit located on an output side of the diode bridge for supplying forward biased voltage to said diode bridge; and
   a power supply circuit supplying power to said forward biasing circuit;
   wherein said forward biasing circuit is connected in series in relation to said diode bridge,
   wherein said forward biasing circuit causes said diode bridge to operate in an activated state by supplying said forward biased voltage to said diode bridge,
   wherein current-voltage characteristics of said telephone terminal equipment interface circuit are such that both said current and said voltage increase in linear proportion from a starting point.

2. The telephone terminal equipment interface circuit according to claim 1 wherein said forward biasing circuit is a diode element biased in a forward direction.

* * * * *